(12) United States Patent
Howard

(10) Patent No.: US 8,307,096 B2
(45) Date of Patent: Nov. 6, 2012

(54) METHOD AND SYSTEM FOR MANAGING THE TRANSFER OF FILES AMONG MULTIPLE COMPUTER SYSTEMS

(75) Inventor: Gregory B. Howard, Ithaca, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 83 days.

(21) Appl. No.: 12/152,477

(22) Filed: May 15, 2008

(65) Prior Publication Data

US 2009/0287830 A1 Nov. 19, 2009

(51) Int. Cl.
*G06F 15/16* (2006.01)
(52) U.S. Cl. ....................................... 709/228
(58) Field of Classification Search ................. 709/230, 709/228
See application file for complete search history.

(56) References Cited

U.S. PATENT DOCUMENTS

| | | | |
|---|---|---|---|
| 5,740,431 A | 4/1998 | Rail | |
| 7,222,160 B2 | 5/2007 | Hlasny | |
| 7,228,352 B1 | 6/2007 | Yaguchi et al. | |
| 7,263,528 B2 | 8/2007 | Haff et al. | |
| 7,289,973 B2 | 10/2007 | Kiessig et al. | |
| 7,565,414 B1* | 7/2009 | Love | 709/219 |
| 2002/0040389 A1* | 4/2002 | Gerba et al. | 709/219 |
| 2003/0208565 A1* | 11/2003 | Nishihara et al. | 709/219 |
| 2005/0080801 A1* | 4/2005 | Kothandaraman et al. | 707/100 |
| 2005/0138350 A1* | 6/2005 | Hariharan | 713/151 |
| 2005/0198493 A1* | 9/2005 | Bartas | 713/154 |
| 2005/0207638 A1* | 9/2005 | Staveley | 382/145 |
| 2006/0080334 A1 | 4/2006 | Wang et al. | |
| 2007/0033235 A1 | 2/2007 | Kato et al. | |
| 2007/0250544 A1 | 10/2007 | Shibata et al. | |
| 2008/0016160 A1* | 1/2008 | Walter et al. | 709/206 |

* cited by examiner

*Primary Examiner* — John MacIlwinen

(57) ABSTRACT

A system and method is disclosed for transferring files from a source computer to a destination computer. The system and method comprises reading a configuration file containing one or more parameter expressions representing file transfer instructions. One or more transfer files stored on the source computer are identified based on at least one of the parameter expressions contained within the configuration file. The identified transfer files are transferred from the source computer to the destination computer in accordance with the parameter expressions contained within the configuration file.

23 Claims, 5 Drawing Sheets

METHOD AND SYSTEM FOR MANAGING THE TRANSFER OF FILES AMONG MULTIPLE COMPUTER SYSTEMS

BACKGROUND OF THE INVENTION

This application relates generally to managing the collection and delivery of files among multiple computer systems, and more particularly, to a customizable file transfer method and system that suits the specific needs of any file transfer session.

There are many known file transfer protocols (e.g., FTP, SFTP, RCP, SCP Kermit, etc.) that work within a wide range of operating systems. File transfer methods utilize known file transfer protocols and add features to meet the needs of a specific type of file transfer session. These methods are typically written to execute in a specific operating system (e.g., UNIX/LINUX, the Mac OS, etc.). They can have a graphical user interface ("GUI") or can be run on a command line. Generic file transfer methods require users to name the set of files to be transferred and specify their destination. These conventional applications are designed for interactive use during each file transfer. There are other custom methods available that are limited to one or two specific file transfer situations.

There are instances when files need to be transferred repeatedly where exact file names and destinations are not known. These situations require development of custom applications for every file transfer or they require users to manually select the files and destinations for each individual file transfer. For instance, it might be necessary to transfer a set of files beginning with the characters "$PM_{13}$" between two systems using FTP protocol. A software developer could create a customized application or script to search for all files beginning with the characters "PM_" from the source directory and transfer them to the destination system. If additional transfer criteria were desired, the software developer would be required to create a new application or script to send, for example, only the newest file of the set of files beginning with the characters "PM_". If further transfer criteria were also required, then the software developer would be required to create yet another application or script to, for example, delete the source file after it has been sent to the destination system.

Because there are an infinite number of custom file transfer applications possible to handle any number of file transfer situations, it is desirable to have a customizable, non-interactive method and system that meets the needs of any desired file transfer session. Such a method and system would be flexible enough to easily incorporate new custom requirements as they arise and can be structured to take different types of transfer criteria into account.

BRIEF SUMMARY OF THE INVENTION

The invention provides improved techniques for transferring files from a source computer to a destination computer. The system and method utilize a configuration file containing one or more parameter expressions representing file transfer instructions. One or more transfer files stored on the source computer are identified based on at least one of the parameter expressions contained within the configuration file. The identified transfer files are transferred from the source computer to the destination computer in accordance with the parameter expressions contained within the configuration file.

These and other advantages of the invention will be apparent to those of ordinary skill in the art by reference to the following detailed description and the accompanying drawings.

DETAILED DESCRIPTION

Figure 1:
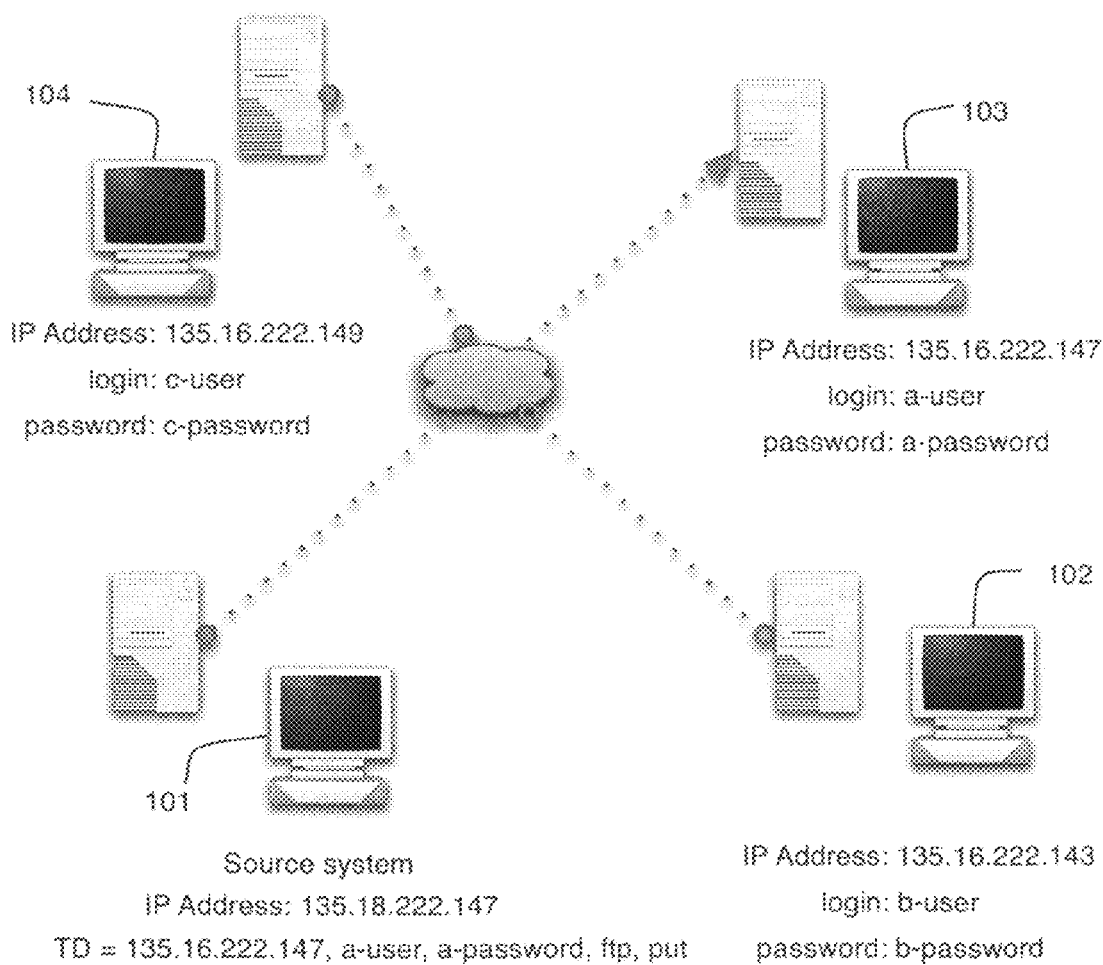
FIG. 1 is a schematic of a system for managing file transfers among multiple computer systems.

A system and method of customizing file transfer sessions using configuration files are disclosed herein. The disclosed system and method (hereinafter referred to as the "Delivery Manager") can be non-interactive and is customizable through a configuration file that specifies unique criteria for each file transfer session. The Delivery Manager is flexible and can evolve as hew custom requirements arise.

The Delivery Manager may be implemented as a series of instructions executing on a computer. Such computers executing programs are well known in the art and may be implemented, for example, using a well known computer processor, memory units, storage devices, computer software, and other components. For example, the Delivery Manager may be a Windows application executing on a desktop or laptop computer. A high-level block diagram of such a computer is shown in FIG. 1A. Computer 101 contains a processor 107 that controls the overall operation of computer 101 by executing computer program instructions defining such operation. The computer program instructions may be stored in a storage device 108 (e.g., magnetic disk) or any other computer-readable medium, and loaded into memory 109 when execution of the computer program instructions is desired. Thus, in one embodiment, the Delivery Manager comprises computer program instructions stored in memory 109 and/or storage device 108, and executed by processor 107. Computer 101 also includes one or more network interfaces 105 for communicating with other devices via a network. Computer 101 may also include input/output devices 106, which represent devices allowing for user interaction with computer 101 (e.g., display, keyboard, mouse, speakers, buttons, etc.). One skilled in the art will recognize that an implementation of an actual computer may contain additional components and that FIG. 1A is a high level representation of some of the components of such a computer for illustrative purposes.

Figure 1A:
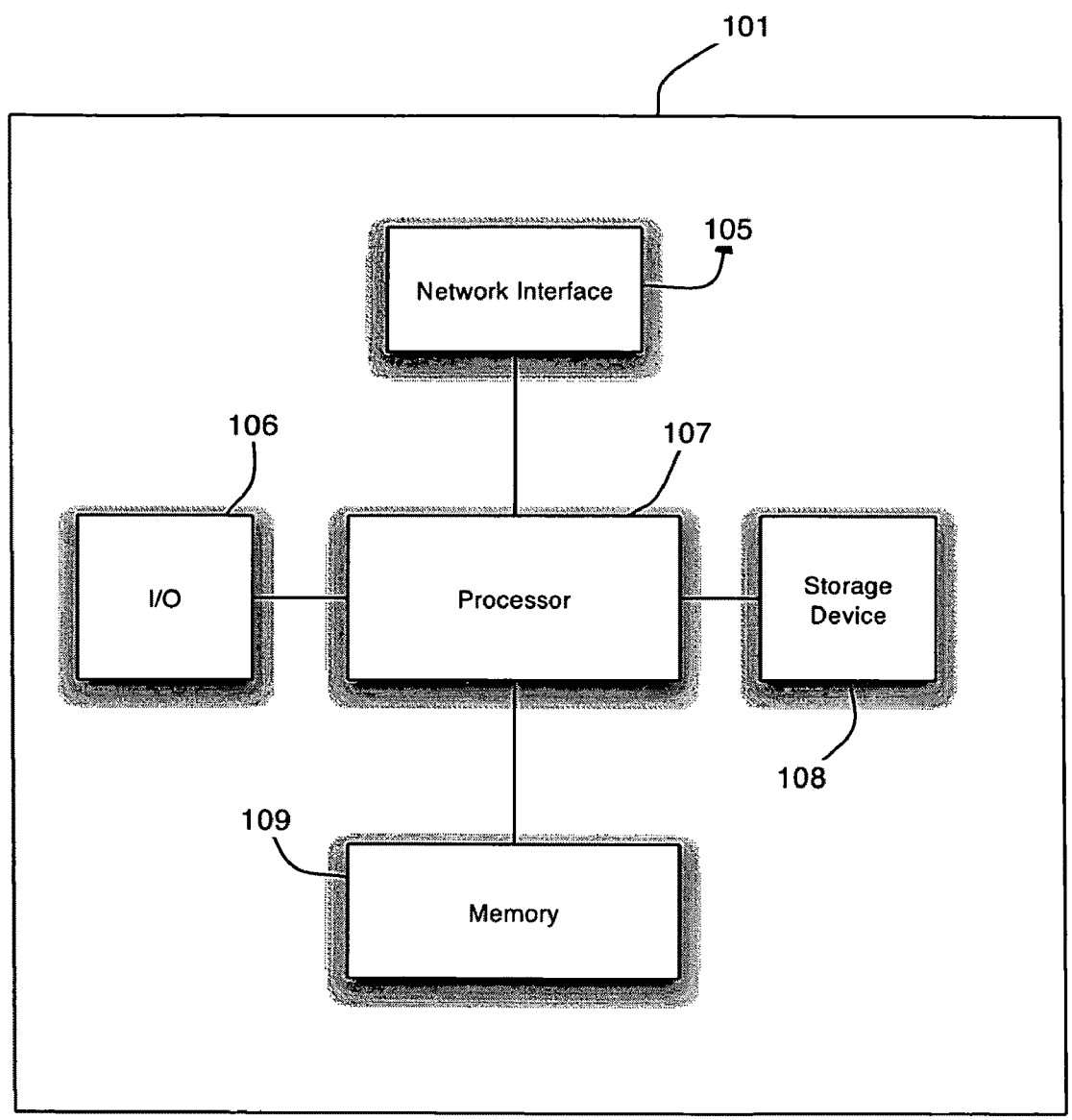
FIG. 1A is a high level diagram of a computer system for managing file transfers among multiple computer systems.

FIG. 1 illustrates four exemplary networked computer systems 101, 102, 103, 104, each with a unique IP address. In this example, the Delivery Manager is illustrated in FIG. 1 as implemented on computer system 101. It is understood, however, that the Delivery Manager could be implemented on any computer system or multiple computer systems in a network. Thus, the Delivery Manager could execute on all networked computer systems 101, 102, 103, 104, . . . delivering files to each other at the same time, or on one or more of the computer systems 101, 102, 103 and/or 104 to deliver files to the appropriate destination computer systems. This description will refer to the computer system delivering the files as the "source computer" and the computer system receiving the files as the "destination computer."

Figure 4:
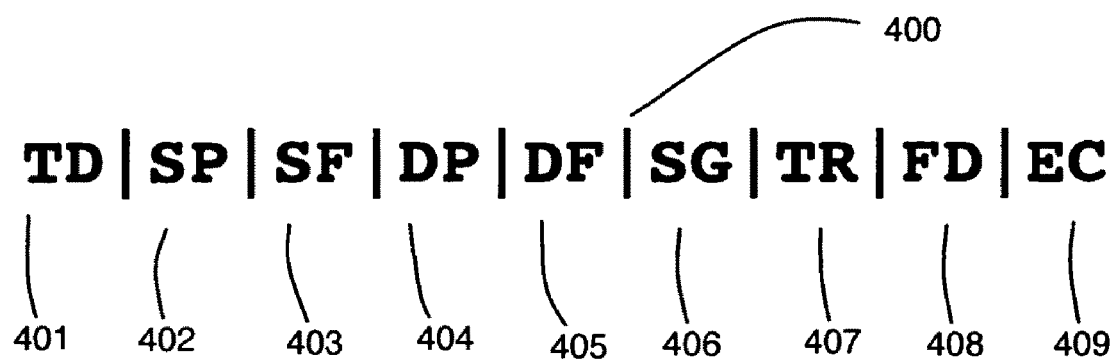
FIG. 4 illustrates a configuration file for use in managing file transfers among multiple computer systems.

An exemplary configuration file 400 for transferring files between computer systems is illustrated in FIG. 4. The configuration file 400 can contain different parameters in different formats. The configuration file 400 can be stored on a storage device 108. The details of the configuration file 400 will be explained further below.

Figure 2:
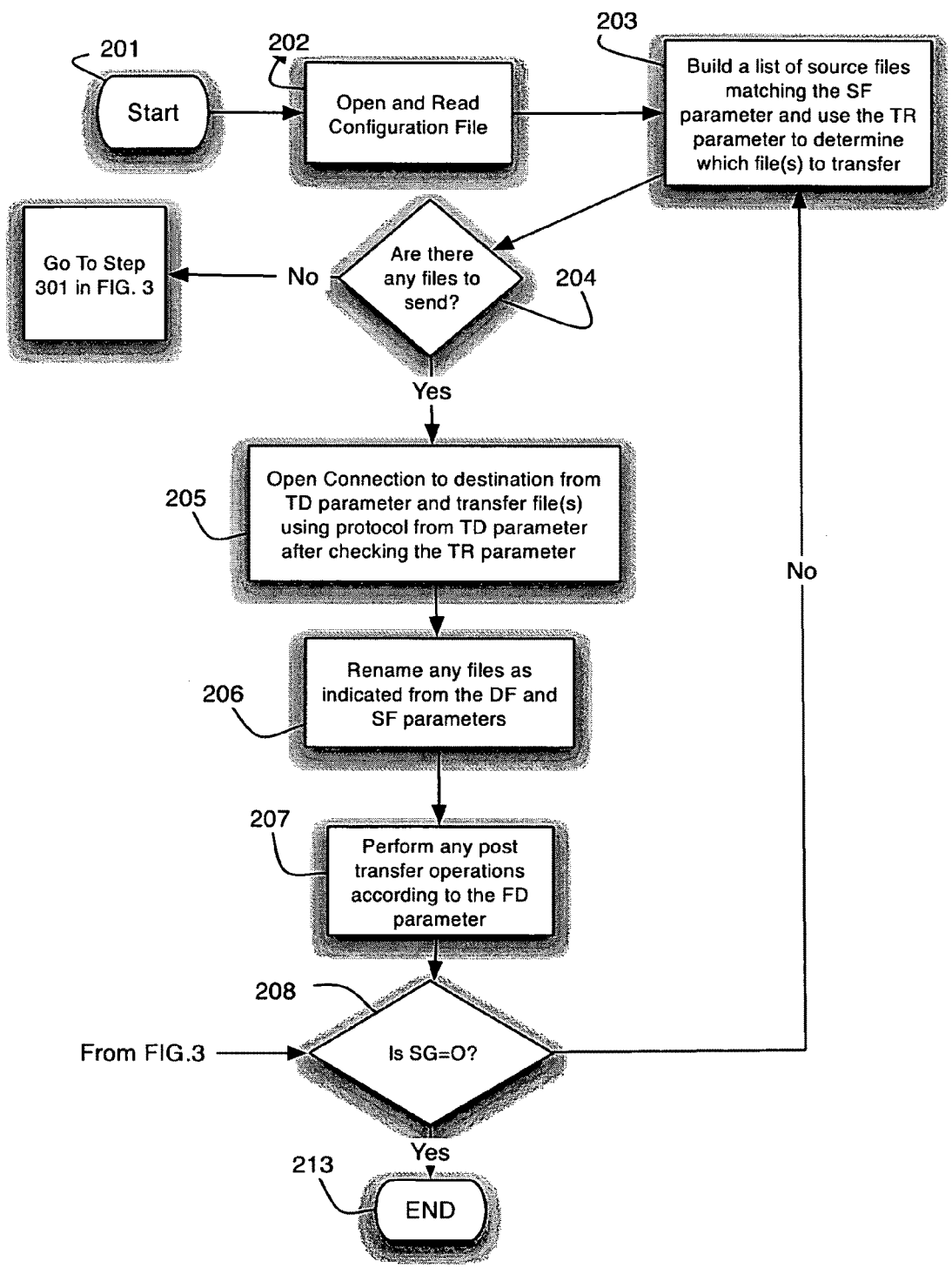
FIG. 2 is a flow chart illustrating a main sequence of steps for managing file transfers among multiple computer systems.

Referring to FIG. 2, the Delivery Manager opens and reads the configuration file 400 from a storage device 108 or other computer-readable medium in step 202 before beginning any file transfer activity. Once the configuration file 400 is parsed and the configuration file parameters stored into memory 109, the Delivery Manager proceeds to step 203. During a file transfer session, the Delivery Manager will adhere to the file transfer parameters in the configuration file 400 stored in memory 109. In step 203, a source file list is created matching the Source File ("SF") and Transfer Readiness ("TR") parameters 403, 407 of the configuration file 400. In step 204, the Delivery Manager determines whether there are files to transfer based on the configuration file 400. Thus, when new transfer requirements arise, only the configuration file parameters need to change, as opposed to requiring a software developer to write a new custom application or script to facilitate the file transfer.

During a file transfer session, the Delivery Manager is guided by the parameter expressions defined in the configuration file 400. The configuration file 400 can be structured to take different types of transfer criteria into account. In one embodiment, the Delivery Manager uses, for example, a Perl script named "deliveryManager.pl". Rather than hard-coding the configuration file name within the script, the configuration file 400 is preferably provided to the Delivery Manager on the command line as:

deliveryManager.pl —c<configFilename>.cfg

This allows the Delivery Manager to run for different purposes on the same computer system. Different instances of the Delivery Manager can run at the same time, with each instance using a different configuration file 400.

The Delivery Manager can be scheduled using a third party job-scheduling manager, for example, crontab on the UNIX operating system. Multiple instances can be scheduled, each having its own configuration file 400. Alternatively, the Delivery Manager can run in the background, for example a daemon process in the UNIX operating system. Multiple instances can run at the same time and each instance can execute different types of file transfers.

An advantageous embodiment uses the command line flag "—c" to instruct the Delivery Manager that the subsequent text on the command line is a configuration filename. Each configuration file 400 may have a name that is descriptive of its purpose. The full path name could also be provided on the command line:

deliveryManager.pl —c/home/tmp/config/<configFilename1>.cfg

Referring to FIG. 4, the configuration file 400 preferably includes fields representing different file transfer parameters. In this embodiment, the Delivery Manager is responsible for opening the configuration file 400 and parsing out the field parameters. The field parameters in the configuration file 400 are described below:

Transfer Details ("TD") Parameter 401

The TD field parameter 401 in the configuration file 400 contains information concerning the destination computer system and can have the following format:

<system>,<login>,[<password>],[<protocol>],[<command>]

The <system> sub-field may be a system name or an IP address. The <login> and <password> sub-fields represent the username and password for the destination computer system. The <password> field can be ignored if the protocol used is Secure File Transfer Protocol ("SFTP"). The <protocol> sub-field represents the file transfer protocol to be used. If the <protocol> sub-field is left blank, the Delivery Manager may, for example, default to File Transfer Protocol ("FTP"). The <command> sub-field can be either a "get" command or a "put" command. An FTP "put" command will transfer files to the destination computer system. An FTP "get" command will take files from the remote source computer system and transfer them into the local destination computer system. An exemplary TD parameter 401 entry could be:

TD=135.16.222.147, a-user, a-password, ftp, put

This exemplary entry instructs the Delivery Manager to login to IP address 135.16.222.147, using the user name "a-user" and password "a-password." FTP is the protocol to be used, and the FTP command to be executed is "put." FIG. 1 illustrates how the method running on computer system 101 would transfer a file to computer system 103 since the TD parameter 401 is set to point to that destination computer system 103. For the computer system 101 to transfer a file(s) to destination computer system 104, the TD parameter 401 would have to change to the following exemplary entry:

TD=135.16.222.149, c-user, c-password, ftp, put

Source Path ("SP") Parameter 402

The SP parameter 402 in the configuration file 400 indicates where the export files are located on the source computer and/or where the imported files will be placed on the destination computer. The source path provided must be valid. For SFTP "put" requests, the SP parameter 402 will be skipped if the source path is invalid. The files in the specified source path will always be considered ready to send unless another configuration indicates otherwise.

Source File ("SF") Parameter 403

The SF parameter 403 in the configuration file 400 indicates the name of the transfer file(s). An exact name (e.g., filename.txt) or wildcards can be used (e.g., filename.* or *.doc).

Destination Path ("DP") Parameter 404

The DP parameter 404 in the configuration file 400 specifies a valid path name on the destination computer system. For SFTP "put" requests, the DP parameter 404 will be skipped if the path is invalid.

Destination File ("DF") Parameter 405

The DF parameter 405 in the configuration file 400 indicates the name of the file at the destination computer. Referring to FIG. 2, a connection to the destination computer is established in step 205 using the IP address or system name provided by the TD parameter 401. Once a connection is established in step 205, file transfer begins using the protocol provided by the TD parameter 401.

In step 206, the Delivery Manager determines whether any files need to be renamed according to the DF and SF parameters 403, 405. The DF parameter 403 can be used to rename a file upon arrival at the destination computer. A DF value of "*" instructs the Delivery Manager to keep the name of each file matching the expression in the SF parameter 403. A static string followed by a "*", for example "ABC-*", will result in pre-pending the filenames with the letters "ABC-". If the SF parameter expression contains one or more wildcards, the DF parameter expression 403 must be "*" unless the Transfer Readiness ("TR") parameter 407 is set to option "N" or "F"

(the TR parameter 407 is explained further below). If only one file is transferred, the destination filename can only be an explicit filename.

Scheduling Specification ("SG") Parameter 406

Figure 3:
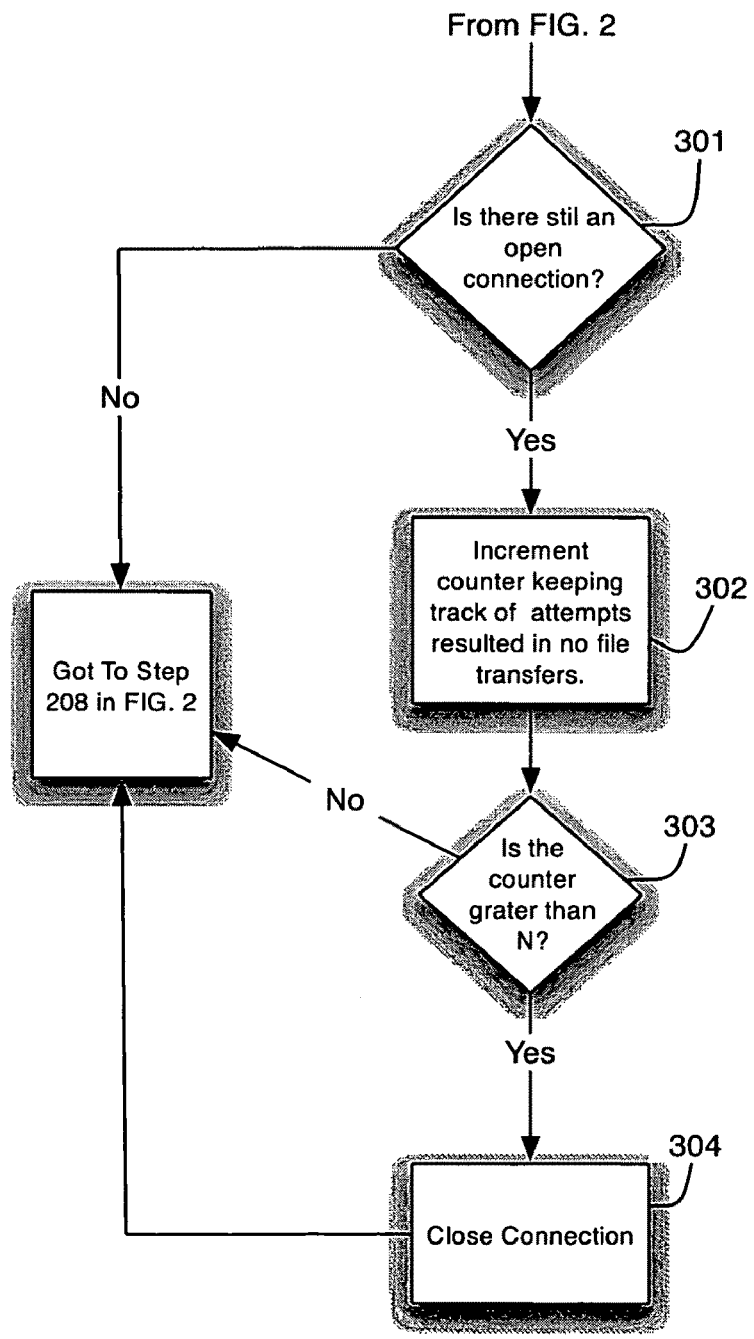
FIG. 3 is a flow chart illustrating a branching sequence of steps for managing file transfers among multiple computer systems.

The SG parameter 406 in the configuration file 400 informs the Delivery Manager how the current file transfer is to be scheduled. A value of "O" instructs the Delivery Manager in step 208 to terminate at step 213 once the transfer is complete. This setting is useful when a third party job-scheduling manager, such as crontab in a UNIX environment, is used to run and repeat execution of the Delivery Manager. In contrast, a value of "R" instructs the Delivery Manager to go back to step 203 to repeat the file transfer by again building a list of source files matching the SF parameter 403 in the configuration file 400 and using the TR parameter 407 to determine which files to transfer. This setting can be used when the Delivery Manager itself, not a job-scheduling manager, is responsible for repeated file transfers. The "R" setting can also be accompanied by a wait or delay time and a count value. The wait time instructs the Delivery Manager how long to wait or delay between the completion of step 208 and the start of step 203. The count value is a variable defined in the Delivery Manager that keeps track of how many transfer attempts resulted in no file transfers. If there are no files to transfer in step 204, the Delivery Manager proceeds to step 301 in FIG. 3, where the Delivery Manager determines whether a connection to the destination computer is still open. If the connection is still open, the count value is incremented one unit in step 302. In step 303, the Delivery Manager compares the count value to a pre-defined or predetermined constant N, which specifies the maximum allowable file transfer attempts resulting in no file transfers. If the count value is greater than N, then the connection to the destination computer is closed in step 304. Steps 303 and 304 prevent connections from being idle for long periods of time. When the "R" setting is used within the SG parameter 406, the Delivery Manager will continuously loop back to step 203 from step 208 after the predetermined wait time, if any, expires.

Transfer Readiness ("TR") Parameter 407

The TR parameter 407 in the configuration file 400 defines conditions on the file transfer, which are used by the Delivery Manager in step 205. For instance, a TR parameter 407 setting of "A" could instruct the Delivery Manager to transfer the file(s) unconditionally the moment they are identified in step 203. The "A" setting could be the default if no TR parameter 407 setting is provided in the configuration file 400. In contrast, the setting "N" could instruct the Delivery Manager to transfer the newest or most recent file in the set of files matching the SF parameter 403. The "N" setting is preferably only valid with SFTP "put" requests. Similarly, a TR parameter 407 setting of "F" could instruct the Delivery Manager to transfer only the first or last file matching the SF parameter expression 403. The "F" setting may be accompanied by a sort order, which could be, for example, "A" for ascending or "D" for descending. Thus, a TR parameter 407 setting of "F,D" might instruct the Delivery Manager to transfer the first file of a descending sorted list of files. The "F" setting is preferably only valid with SFTP "put" requests. The TR parameter 407 setting of "D" could instruct the Delivery Manager to transfer the file(s) only if different than the last time they were transferred. The "D" setting can be accompanied by a specified predefined time. In this advantageous embodiment, the file transfer will be forced regardless of change when the specified time expires. The time specification can be indicated in seconds. An exemplary full TR parameter 407 expression might look like: TR="D,86400". This TR parameter 407 setting instructs the Delivery Manager to transfer the file(s) if different than the previous transfer, unless 86400 seconds have elapsed since the last transfer.

File Disposition ("FD") Parameter 408

The FD parameter 408 of the configuration file 400 specifies whether any post transfer operations are to be performed in step 207. An FD parameter 408 setting of "D" could instruct the Delivery Manager to delete the source file after a successful transfer to the destination computer system. The "D" setting is preferably only valid with SFTP "put" requests. In contrast, an FD parameter 408 setting of "M" might instruct the Delivery Manager to move the file after a successful transfer. The "M" setting is preferably accompanied by a valid file path destination indicating where to place the file. Additional modifiers may also accompany the "M" setting. For instance, if the TR parameter 407 is set to "F" or "D", the FD parameter 408 setting of "FD=M" can also specify what files to move. The "M" parameter may also include a timestamp that will be appended to the moved filename. The following is an example of an FD parameter 408 setting of "M":

FD=M,/archive/data/input

The above FD parameter 408 setting instructs the Delivery Manager to move the file(s) matching the SF parameter 403 expression to "/archive/data/input" after a successful transfer.

Another exemplary FD parameter 408 setting of "M" might be:

FD=M,/archive/data/input,*

The above FD parameter setting is appropriate when combined with a TR parameter 407 setting of "TR=N" or "TR=F." This FD parameter 408 setting instructs the Delivery Manager to move all the files, not just the newest or the first file transferred, to the specified directory. If a "TR=N" or "TR=F" setting is used, the above command will ensure that older files will not be transferred during the next transfer session.

Another exemplary FD parameter 408 setting of "M" might be:

FD=M,/archive/data/input,TS

The fourth value of this FD parameter 408 setting instructs the Delivery Manager to append a timestamp to the file. An exemplary timestamp format is "YYYYMMDD_hhmmss."

An FD parameter 408 setting of "C" might instruct the Delivery Manager to copy the file after a successful transfer. The format and optional modifiers that can accompany the "M" setting can also accompany the "C" setting. The "C" setting is preferably only valid with SFTP "put" requests. An FD parameter 408 setting of "T" might instruct the Delivery Manager to "touch" the file after it has been transferred. This can be accomplished in the same manner as the "touch" command in UNIX. An FD parameter 408 setting of "L", which could be the default setting, instructs the Delivery Manager to leave the file alone.

External Command ("EC") Parameter 409

The EC parameter 409 of the configuration file 400 preferably instructs the Delivery Manager to run an external command. If the EC parameter 409 is the only parameter in the configuration file 400, the Delivery Manager can simply execute the external command without any file transfer.

In addition to the above, the Delivery Manager can have additional features. For instance, debugging information can be produced with command line parameters. Here, the command line option "−1" could instruct the Delivery Manager to produce debugging messages to an output file. The option can have different levels of debugging detail. For example, the levels, from most detailed to less detail, can be in the following order: "−1 debug", "−1 info", "−1 warn", "−1 error", and "−1 fatal". The high availability functionality can be triggered with an "–a" command line option. Debugging mode for the Net::ftp functionality can be turned on with, for example, the "–d" command line option.

A notification can be sent, while the Delivery Manager is running in background, instructing the Delivery Manager to re-read the configuration file 400. This feature facilitates. configuration file 400 updates since restarting the process after every configuration file change can adversely affect a system.

An environment variable can be defined with different possible locations of the specified configuration file 400. For example, an embodiment running on a UNIX system can have the following environment variable:

DM_CONFIG_DIR=/home/temp/config;/home/delivery/config

In this case, the Delivery Manager can be run on the command line as the following:

deliveryManager.pl —c configfile.txt

The Delivery Manager can first look in "/home/temp/config" to find the configuration file 400 named configfile.txt; and, if not found, it will then look in "/home/delivery/config."

A threaded embodiment can also be implemented while running the Delivery Manager in the background. In this embodiment, each thread will comply with its own configuration file.

The Delivery Manager can also have an automatically adjustable or predetermined waiting period or delay between the completion of step 208 and the commencement of step 203 of FIG. 2, depending on different factors. For example, a system might have a high volume of transferable files appear over a sustained period with a sudden decrease in the volume of files. It might be necessary to reduce, or even eliminate, the wait period between steps 208 and 203 of FIG. 2 when the volume is high and extend it when the volume is low. Also, the transfer of a particular file(s) might continually fail. It might be necessary to reduce the wait time up to some limit until the file transfer is successful. This feature could be turned on with a command line parameter or as a new configuration file parameter.

The Delivery Manager could have a configurable parameter that limits the number of transferred files for a given configuration line during a transfer session. This is useful if file transfers were paused for a prolonged period of time due to an outage. When the Delivery Manager is restarted, there might be a very large number of transferable files, which could be problematic given the state of a system after an outage.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein. For example, although the Delivery Manager may be written in the Perl scripting language executing in a UNIX environment, it is understood that the Delivery Manager may be written in any programming language executing in any operating system (e.g., executing in a Windows based system using GUI instead of a command line approach). In addition, the Delivery Manager may be implemented in hardware using appropriately configured circuits.

What is claimed is:

1. A method for transferring files from a source computer to a destination computer, comprising:

reading a configuration file received from the source computer, the configuration file containing a plurality of parameter expressions representing file transfer instructions and post transfer operations;

identifying a transfer file stored on the source computer based on the plurality of parameter expressions contained within the configuration file;

determining whether the transfer file is to be transferred based on the configuration file;

transferring, in response to determining whether the transfer file is to be transferred based on the configuration file, the transfer file from the source computer to the destination computer in accordance with the plurality of parameter expressions contained within the configuration file;

executing, at the source computer, the post transfer operations on the transfer file stored on the source computer in response to successful transfer of the transfer file to the destination computer;

generating, at the source computer, an output file including debugging messages, the debugging messages having different levels of detail based on the plurality of parameter expressions, wherein the output file is generated based on receipt of a command line parameter that corresponds to one of the different levels of detail that include: warnings, errors and fatal errors;

wherein the plurality of parameter expressions includes a configurable parameter that limits a number of transferred files;

incrementing a counter each time no files are identified on the source computer matching the source file and transfer condition parameters;

re-attempting to identify files on the source computer matching the source file and transfer condition parameters; and closing a connection between the source computer and the destination computer when the counter exceeds a predetermined number of attempts to identify files on the source computer matching the source file and transfer condition parameters.

2. The method according to claim 1, wherein the plurality of parameter expressions contained in the configuration file includes a transfer detail parameter identifying the destination computer and the source computer, and a source file parameter identifying the transfer file to be transferred.

3. The method according to claim 2, further comprising identifying predetermined conditions that must be satisfied before transferring the transfer file based on a transfer condition parameter contained in the configuration file specifying the predetermined conditions.

4. The method according to claim 3, further comprising establishing a connection between the source computer and the destination computer after identifying the transfer file based on the source file parameter and when the predetermined conditions specified by the transfer condition parameter are satisfied.

5. The method according to claim 3, further comprising repeating the identifying and the transferring after the transfer file is transferred when a scheduling parameter expression in the configuration file specifies that another file transfer should be attempted.

6. The method according to claim 2, further comprising identifying where the transfer file to be transferred is located on the source computer based on a source path parameter expression contained within the configuration file specifying a location of the transfer file to be transferred on the source computer.

7. The method according to claim 2, further comprising identifying where the transfer file is to be stored on the destination computer based on a destination path parameter contained within the configuration file specifying a location where the transfer file is to be stored.

8. The method according to claim 2, further comprising naming the transfer file stored on the destination computer based on a destination file parameter contained within the configuration file that specifies a name of the transfer file after transferring the transfer file to the destination computer.

9. An apparatus comprising:
a memory storing computer program instructions;
a processor communicatively coupled to the memory, the processor configured to execute the computer program instructions, which, when executed on the processor, cause the processor to perform operations comprising:
reading a configuration file received from a source computer, the configuration file containing a plurality of parameter expressions representing file transfer instructions and post transfer operations;
identifying a transfer file stored on the source computer based on the plurality of parameter expressions contained within the configuration file;
determining whether the transfer file is to be transferred based on the configuration file;
transferring, in response to determining whether the transfer file is to be transferred based on the configuration file, the transfer file from the source computer to a destination computer in accordance with the plurality of parameter expressions contained within the configuration file;
executing, at the source computer, the post transfer operations on the transfer file stored on the source computer in response to successful transfer of the transfer file to the destination computer;
generating, at the source computer, an output file including debugging messages, the debugging messages having different levels of detail based on the plurality of parameter expressions, wherein the output file is generated based on receipt of a command line parameter that corresponds to one of the different levels of detail that include: warnings, errors and fatal errors;
wherein the plurality of parameter expressions includes a configurable parameter that limits a number of transferred files;
incrementing a counter each time no files are identified on the source computer matching the source file and transfer condition parameters;
re-attempting to identify files on the source computer matching the source file and transfer condition parameters; and
closing a connection between the source computer and the destination computer when the counter exceeds a predetermined number of attempts to identify files on the source computer matching the source file and transfer condition parameters.

10. The apparatus according to claim 9, wherein the plurality of parameter expressions contained in the configuration file includes a transfer detail parameter identifying the destination computer and the source computer, and a source file parameter identifying the transfer file to be transferred.

11. The apparatus according to claim 10, the operations further comprising: identifying predetermined conditions that must be satisfied before transferring the transfer file based on a transfer condition parameter contained in the configuration file specifying the predetermined conditions.

12. The apparatus according to claim 11, the operations further comprising: establishing a connection between the source computer and the destination computer after identifying the transfer file based on the source file parameter and when the predetermined conditions specified by the transfer condition parameter are satisfied.

13. The apparatus according to claim 10, the operations further comprising: identifying where the transfer file to be transferred is located on the source computer based on a source path parameter expression contained within the configuration file specifying a location where the transfer file is to be stored.

14. The apparatus according to claim 10, the operations further comprising: identifying where the transfer file is to be stored on the destination computer based on a destination path parameter contained within the configuration file specifying a location where the transfer file is to be stored.

15. The apparatus according to claim 10, the operations further comprising: naming the transfer file stored on the destination computer based on a destination file parameter contained within the configuration file that specifies a name of the transfer file after transferring the transfer file to the destination computer.

16. A non-transitory computer-readable medium storing computer program instructions for transferring files from a source computer to a destination computer, which, when executed on a processor, cause the processor to perform operations comprising:
reading a configuration file received from the source computer, the configuration file containing a plurality of parameter expressions representing file transfer instructions and post transfer operations;
identifying a transfer file stored on the source computer based on the plurality of parameter expressions contained within the configuration file;
determining whether the transfer file is to be transferred based on the configuration file;
transferring, in response to determining whether the transfer file is to be transferred based on the configuration file, the transfer file from the source computer to the destination computer in accordance with the plurality of parameter expressions contained within the configuration file;
executing, at the source computer, the post transfer operations on the transfer file stored on the source computer in response to successful transfer of the transfer file to the destination computer;
generating, at the source computer, an output file including debugging messages, the debugging messages having different levels of detail based on the plurality of parameter expressions, wherein the output file is generated based on receipt of a command line parameter that corresponds to one of the different levels of detail that include: warnings, errors and fatal errors;
wherein the plurality of parameter expressions includes a configurable parameter that limits a number of transferred files;
incrementing a counter each time no files are identified on the source computer matching the source file and transfer condition parameters;
re-attempting to identify files on the source computer matching the source file and transfer condition parameters; and
closing a connection between the source computer and the destination computer when the counter exceeds a predetermined number of attempts to identify files on the source computer matching the source file and transfer condition parameters.

17. The non-transitory computer-readable medium according to claim 16, wherein the plurality of parameter expressions contained in the configuration file includes a transfer detail parameter identifying the destination computer and the source computer, and a source file parameter identifying the transfer file to be transferred.

18. The non-transitory computer-readable medium according to claim 17, the operations further comprising: identifying predetermined conditions that must be satisfied before transferring the transfer file based on a transfer condition parameter contained in the configuration file specifying the predetermined conditions.

19. The non-transitory computer-readable medium according to claim 18, the operations further comprising: establishing a connection between the source computer and the destination computer after identifying the transfer file based on the source file parameter and when the predetermined conditions specified by the transfer condition parameter are satisfied.

20. The non-transitory computer-readable medium according to claim 18, the operations further comprising: repeating the identifying and the transferring after the transfer file is transferred when a scheduling parameter expression in the configuration file specifies that another file transfer should be attempted.

21. The non-transitory computer-readable medium according to claim 17, the operations further comprising: identifying where the transfer file to be transferred is located on the source computer based on a source path parameter expression contained within the configuration file specifying a location of the transfer file to be transferred on the source computer.

22. The non-transitory computer-readable medium according to claim 17, the operations further comprising: identifying where the transfer file is to be stored on the destination computer based on a destination path parameter contained within the configuration file specifying a location where the transfer file is to be stored.

23. The non-transitory computer-readable medium according to claim 17, the operations further comprising: naming the transfer file stored on the destination computer based on a destination file parameter contained within the configuration file that specifies a name of the transfer file after transferring the transfer file to the destination computer.

* * * * *